United States Patent Office.

EDWARD JOSEPH DE SMEDT, OF NEW YORK, N. Y,

*Assor to Grahamite Asphalt Company of same place*

Letters Patent No. 109,597, dated November 29, 1870.

IMPROVEMENT IN ASPHALT PAVEMENTS.

The Schedule referred to in these Letters Patent and making part of the same.

*To all whom it may concern:*

Be it known that I, EDWARD JOSEPH-DE SMEDT, of the city, county, and State of New York, have invented a new and useful Improvement in Asphalt Pavements; and I do hereby declare that the following is a full, clear, and exact description of the same.

This invention consists in the combination of several natural asphalts, both hard and soft, which will, when mixed and combined, and also properly applied, admit of being evenly spread upon the surface or road-bed designed for it, and also possess the quality of withstanding ordinary degrees of heat and cold without being materially affected by extremes.

Many asphalts of the hard kind are difficult to melt and spread evenly on a road surface, and the soft kinds are, of course, too liquid. To remedy this difficulty I therefore combine the two kinds, as follows:

Of the hard asphalts, such as Trinidad, Cuban, and such like, I take one hundred parts; Grahamite or Ritchie mineral, or Albertite, either or both, five to fifty parts; soft or liquid asphalt or bitumen. such as the Mexican, from ten to fifty parts.

The hard asphalt, such as the Trinidad or Cuban, and the soft or liquid asphalt, such as the Mexican, are first melted and thoroughly mixed together, and, while hot, I add to the mixture from five to fifty parts of the Grahamite or Albertite, either or both, in a powdered state. The Grahamite or Albertite is simply mixed with the other asphalts above mentioned; time not being allowed it (the Grahamite or Albertite) to dissolve with the first-named ingredients. I then add heated sand or powdered stone, limestone or other stone, and the whole of the ingredients are then well mixed by means of any suitable machinery, and applied to the road surface.

The Grahamite or Ritchie mineral, as well as the Albertite, absorb the excess of bitumen or soft asphalt, and the mass rapidly hardens, and is rendered capable of withstanding the temperature of our summer months.

Grahamite, sometimes termed Ritchie mineral, is found in Ritchie county, West Virginia, and it may be in other localities. Albertite is found in New Brunswick, in the Dominion of Canada, and also, perhaps, in other places.

I wish it to be clearly understood that by the term "asphalt" I mean the natural product thus termed by chemists and geologists, and not any of the products of the distillation of bituminous coal, which are frequently, but incorrectly, thus termed.

I claim as new and desire to secure by Letters Patent—

The combination of hard and soft natural asphalts, such as the Trinidad, Cuban, Grahamite, or Albertite, and Mexican, or their equivalent natural asphalts, mixed with a suitable proportion of sand or pulverized stone, substantially as and for the purpose herein set forth.

E. J. DE SMEDT.

Witnesses:
  A. R. HAIGHT,
  G. M. ACKERMAN.